United States Patent [19]

Lattery, Jr. et al.

[11] Patent Number: 4,480,926
[45] Date of Patent: Nov. 6, 1984

[54] POWDERED FOOD PRODUCT MIXING DEVICE

[76] Inventors: William F. Lattery, Jr., 10201 Wintergreen St. NW., Coon Rapids, Minn. 55433; Gary J. Crowther, 2417 Western Ave. North, St. Paul, Minn. 55113

[21] Appl. No.: 494,174

[22] Filed: May 13, 1983

[51] Int. Cl.³ .............................................. B01F 7/20
[52] U.S. Cl. .................................. 366/251; 366/327; 366/329; 366/130
[58] Field of Search ............... 366/242, 243, 245, 246, 366/247, 248, 249, 250, 251, 252, 325, 327, 329, 330, 129, 130

[56] References Cited

U.S. PATENT DOCUMENTS

| 960,680 | 6/1910 | Nall | 366/246 |
| 1,732,974 | 10/1929 | Laney | 366/246 |
| 2,108,482 | 2/1938 | Greene | 366/252 |
| 2,289,645 | 7/1942 | Geistert | 366/243 |

Primary Examiner—Robert W. Jenkins
Assistant Examiner—Arthur D. Dahlberg
Attorney, Agent, or Firm—Kinney & Lange

[57] ABSTRACT

A device for mixing an individual serving portion of powdered food product with liquid includes an upwardly open container having a wide screw neck and a cover formed to threadably mount on the neck to form a sealed chamber within the container. A motor is mounted on the top of the cover and drives a rotatable shaft which, when the cover is secured on the container, extends downwardly from the cover into the container chamber along a central axis thereof. The container is generally circular in horizontal cross-section and two spaced apart pairs of blades are fixed to the shaft for rotation therewith. For use, powdered food product and liquid are placed in the container, the cover is secured on the container, and the motor is actuated to cause rotation of the shaft and blades. The blades are uniquely pitched so that their rotation, combined with the circular shape of the container, creates a vortex in the liquid in the container during mixing. This induces air to be entrained in the mixture of powdered food product and liquid in the form of air bubbles, which gives the end product a "whipped" consistancy and increases its total volume.

11 Claims, 3 Drawing Figures

POWDERED FOOD PRODUCT MIXING DEVICE

BACKGROUND OF THE INVENTION

1. Field of the Invention

The present invention relates to mixing devices for powdered food products and liquid, and more specifically, to a compact and easily transportable mixing device for efficiently preparing individual serving portions of such products.

2. Description of the Prior Art

The advent of powdered food products which must be mixed with a liquid prior to consumption has increased the need for mixing devices capable of thoroughly combing such ingredients. While some powdered food products will readily dissolve in liquid, others require a thorough "whipping" to achieve the desired consistency for the end product mixture of processed powdered food product. Blenders, such as the blenders made by the Oster Corporation of Milwaukee, Wis. will provide adequate mixing. A blender typically has a lower base with a motor mounted therein. A container (which has a plurality of blades rotatably mounted adjacent its lower end) sits on top of the lower base with the blades operably engaged by the motor so that the blades turn within the container when the motor is actuated to mix whatever is within the container. Such blenders are typically relatively large, weighing several pounds and not being easily movable from one place to another, such as from home to office. In addition, the containers employed on such blenders are generally unsuitable for both preparing and serving an individual serving portion of processed powdered food product.

Mixing devices which have been designed for preparing single serving portions of food product mixture include those shown in U.S. Pat. No. 3,285,584, granted to Goldfarb on Nov. 15, 1966, and U.S. Pat. No. 3,154,123 and granted to Tomlinson on Oct. 27, 1964. The Goldfarb patent discloses a manually operated stirrer for preparing children's drinks, and which has a recognizable object mounted on the upper end of a rotating shaft extending into a container. When a crank is actuated, the stirrer and object turn together to the amusement of the child. The Tomlinson patent shows a frozen material shaving and mixing apparatus, primarily for use with ice cream, which is also manually operated. The rotating shaft of this device is spring loaded downwardly from its cover to press upon the ice cream or frozen product in the bottom of the container and has blades formed to shave frozen product as the shaft is rotated by hand. Neither of the devices shown in these two patents is capable of producing the suitable mixing force required to produce the desired consistency for many modern powdered food products.

The mixer shown in U.S. Pat. No. 2,749,098, granted to Johnson on June 5, 1956, has the same drawback. The Johnson device has a container with an open upper end with a cap sealably fitted over that upper end. A plurality of beaters are rotatably mounted to the cap to extend into the container when the cap is secured thereto. The beaters are rotated by a feed screw which is manually moved up and down through the cap. The beaters of this device simply do not attain sufficient rotational speed and movement to mix powdered food product and liquid to its desired consistency. U.S. Pat. No. D 95,559, granted to Vogel on May 7, 1935, does show a beverage mixer with a motor positioned above the container for driving a shaft which extends downwardly into the containing and has mixing blades at a bottom thereof. No cover is provided for the container shown in the Vogel design patent, however, so that liquid may splash out during mixing or transport. In addition, the blade formation shown in this device would not produce the necessary and thorough agitation needed to properly process many modern powdered food products.

None of the prior art mixing devices provides a suitable arrangement for preparing individual serving portions of powdered food product and liquid. Preferably, a person may want to place the liquid and powdered food product in the container of a mixing device in the morning but not mix the two ingredients for consumption until lunchtime. In the meantime, the mixing device and ingredients therein may be transported from one place to another, such as from home to work. None of the prior art devices provide a mixing device which can sealably contain the ingredients prior to and after mixing and can produce the desire consistency of processed food product once mixing is performed.

SUMMARY OF THE INVENTION

The mixing device of the present invention comprises a cover designed for use with a container having an open upper end and is used for mixing powdered food product and liquid in such a container. The device includes a removable cover having means to sealably mount the cover over the open end of the container, with motor means mounted with respect to the cover and exteriorly of the container. A rotatable shaft is coupled to the motor means to be rotated thereby and extends outwardly from the cover into the container along a central axis of the container when the cover is mounted on the container. First blade means are secured to the shaft adjacent a lower end thereof, with the first blade means having a first and second blade sections positioned on opposite sides of the shaft, with each blade section having an inner end adjacent the shaft, an outer end, a leading edge with respect to the direction of shaft rotation and a trailing edge. Each blade section of the first blade means is pitched so that its leading edge is closer to the cover than its respective trailing edge and its outer end is closer to the cover than its respective inner end. Second blade means are secured to the shaft above and spaced from the first blade means. The second blade means has first and second blade sections extending outwardly from opposite sides of the shaft generally centered on a line generally perpendicular to a line formed by the blade sections of the first blade means. Each blade section of the second blade means has an inner end adjacent to the shaft, an outer end, a leading edge with respect to the direction of shaft rotation and a trailing edge. Each blade section of the second blade means is pitched so that its leading edge is closer to the cover than its respective trailing edge and its outer end is further from the cover than its respective inner end.

In one preferred embodiment, the container has a generally upright encompassing side wall and is generally circular in horizontal cross-section so that when the motor means is actuated to rotate the rotatable shaft and blade means fixed thereto, the pitch of the blade sections and the generally circular cross-section of the container combine to create a vortex in the liquid and powdered food product being mixed in the container.

When predetermined volumes of liquid and powdered food product are introduced into the container to define an initial mixture volume, the vortex created induces air to be entrained in the liquid to create an end product mixture of liquid, powdered food product and air having a volume greater than the initial mixture volume. Preferably, the container is sized to serve as both a mixing container and a serving vessel for an individual serving portion of powdered food product.

DETAILED DESCRIPTION OF THE PREFERRED EMBODIMENTS

Figure 1:
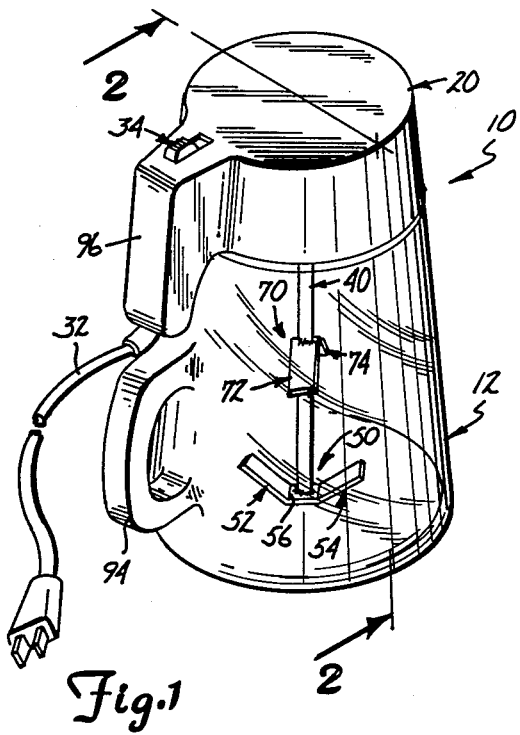
FIG. 1 is a perspective view of a mixing device of the present invention.
Figure 3:
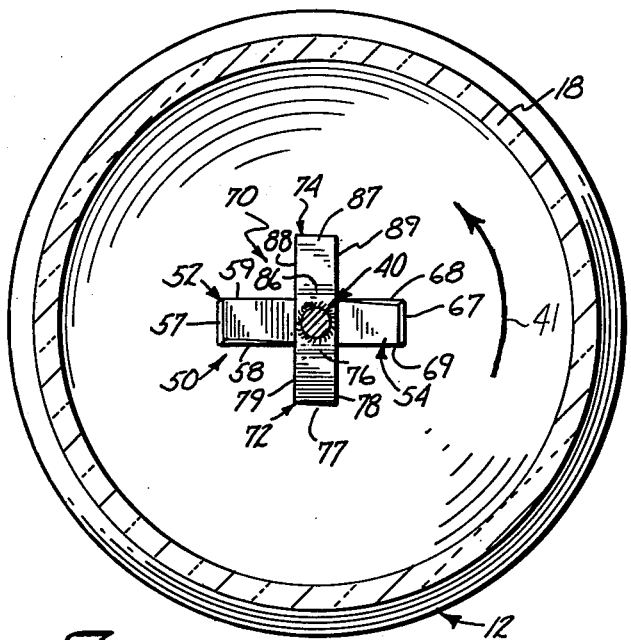
FIG. 3 is a sectional view as taken along line 3—3 in FIG. 2.
Figure 2:
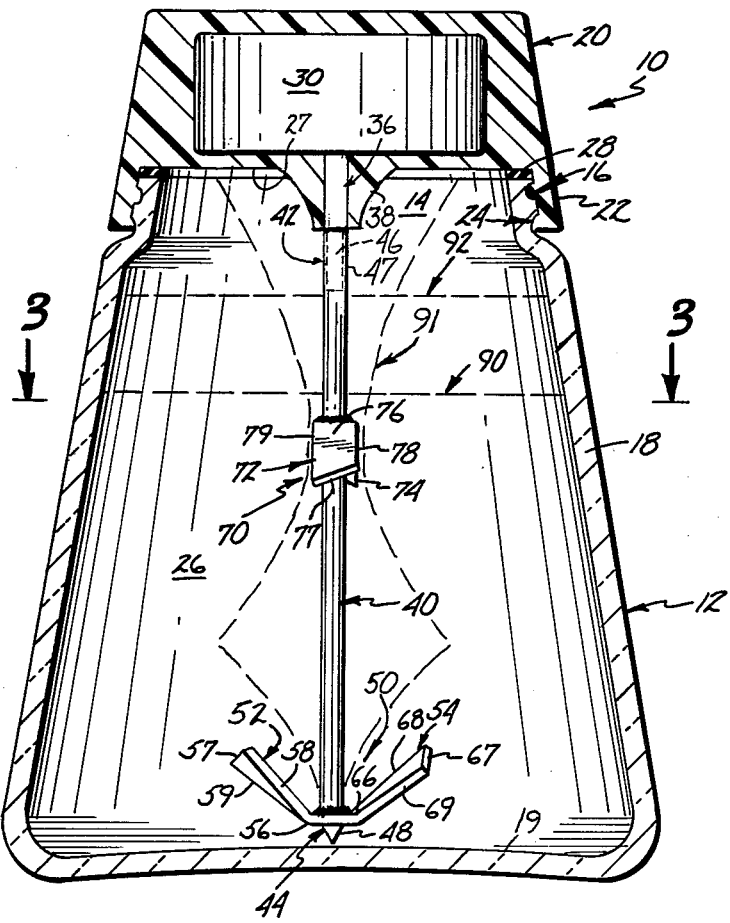
FIG. 2 is a sectional view as taken along line 2—2 in FIG. 1.

In FIG. 1, a mixing device 10 of the present invention is shown. The mixing device 10 has a lower container 12 which is typically formed of glass or plastic. As best shown in FIG. 2, the container 12 has an open upper end portion 14, which is preferably a wide neck having screw threads 16 formed on an outer surface thereof. The container has a generally upright encompassing side wall 18, a bottom wall 19 and is generally circular in horizontal cross-section (as shown in FIG. 3) to define a generally vertical central axis for the container.

A removable cover 20 is sealably mountable over the upper end portion 14 of the container 12. The cover 20 has a flange portion 22 depending downwardly therefrom which has screw threads 24 fitting the screw threads 16 on the outer surface of the wide neck of the container 12. The cover 20 is thus selective securable on the upper open end portion 14 of the container 12 to form a sealed chamber 26 therein, which is defined by the side wall 18 and bottom wall 19 of the container 12 and an inner wall portion 27 of the cover 20.

In one embodiment, the removable cover 20 is provided with a resilient gasket 28 (as shown in FIG. 2) which is positioned for engagement with the upper open end portion 14 of the container 12 when the cover 20 is mounted on the container 12. The gasket 28 further assists in creating a completely fluid-tight seal between the cover 20 and the container 12, and thereby, to further seal the chamber 26 from the exterior of the container 12 and cover 20.

A drive motor 30 is mounted on the cover (exteriorly of the chamber 26 and container 12) and is preferably an electric motor which can be driven by standard household current delivered from a power source (not shown) by cord 32. If desired, a motor 30 can be provided which is capable of being driven off an automobile electrical system. In either case, an on/off switch 34 is provided between the power source and the motor 30 for controlling the operation of the motor 30. As shown in FIG. 1, the switch 34 can be mounted on the removable cover 20 if so desired. The motor 30 has a rotatable drive shaft 36 which extends through the inner wall portion 27 of the cover 20, as shown in FIG. 2. Suitable sealing means, such as sealing portion 38 on the cover 20 is provided to prevent liquid from leaking into the motor 30 adjacent the drive shaft 36 while permitting the drive shaft 36 to rotate. The motor 30 is aligned with respect to the cover 20 so that when the cover 20 is secured to the container 12, the drive shaft 36 is coaxially aligned with the generally vertical central axis of the container 12.

A rotatable shaft 40 is coupled to the drive shaft 36 of the motor 30 to be rotated thereby and extends outward from the cover 20 into the chamber 26 of the container 12 along the container's axis when the cover 20 is mounted on the container 12. The shaft 40 is rotated by the motor 30 in direction as indicated by arrow 41 as viewed in FIG. 3. The rotatable shaft 40 has an upper or proximal end 42 adjacent the cover 20 and motor 30 and a lower or remote end 44 adjacent the bottom wall 19 of the container 12. The rotatable shaft 40 is detachably coupled to the drive shaft 36 of the motor 30 adjacent the upper end 42 of the rotatable shaft 40. In one embodiment, an outer end 46 of the drive shaft 36 is slidably insertable into a sleeve portion 47 at the upper end 42 of the rotatable shaft 40. The outer end 46 and sleeve portion 47 are keyed together for coupled rotation by conventional keying means (not shown) used to connect elements for coupled rotation.

First and second blade means are secured to the shaft 40 to be rotated therewith for mixing the powdered food product and liquid in the container 12. First blade means 50 is secured to the shaft 40 adjacent its lower end 44 as shown. The first blade means 50 has a first blade section 52 and a second blade section 54 which are positioned generally on a line on opposite sides of the shaft 40.

Each blade section has an inner end adjacent to the shaft 40, an outer end, a leading edge with respect to the direction of rotation of the shaft 40 and a trailing edge. Thus, first blade section 52 of the first blade means 50 has an inner end 56, an outer end 57, a leading edge 58 and trailing edge 59. Similarly, second blade section 54 has an inner end 66, an outer end 67, a leading edge 68, and a trailing edge 69. As shown, each blade section 52 and 54 of the first blade means 50 is pitched so that its leading edge is closer to the cover 20 than its respective trailing edge and its outer edge is closer to the cover 20 than its respective inner end. Specifically (as best shown in FIG. 2), the first blade section 52 is pitched so that its leading edge 58 is closer to the cover 20 than its trailing edge 59 and its outer end 57 is closer to the cover 20 than its inner end 56. Similarly, the second blade means 54 is pitched so that its leading edge 68 is closer to the cover 20 than its trailing edge 69 and its outer end 67 is closer to the cover 20 than its inner end 66.

Second blade means 70 is secured to the shaft 40 above and spaced from the first blade means 50. The second blade means 70 has a first blade section 72 and a second blade section 74 which are also positioned generally on a line on opposite sides of the shaft 40. The blade sections 72 and 74 of the second blade means 70 extend outwardly from the shaft 40 generally centered on a line generally perpendicular to a line formed by the blade sections 52 and 54 of the first blade means 50. As best shown in FIG. 3, the first blade means 50 and second blade means 70 are thus generally perpendicular to each other.

Each blade section 72 and 74 of the second blade means 70 has an inner end adjacent the shaft 40, an outer end, a leading edge with respect to the direction of rotation of the shaft 40 and a trailing edge. The blade sections 72 and 74 of the second blade means 70 are also pitched so that the leading edge of each blade section is closer to the cover 20 than its respective trailing edge. As shown in FIG. 2 for example, leading edge 78 of first blade section 72 is closer to the cover 20 than trailing edge 79 of the first blade section 72. The blade sections of the second blade means 70 are not identically pitched with the blade sections of the first blade means 50, however. Each blade section of the second blade means 70 is pitched so that its outer end is farther from the cover 20 than its respective inner end. Thus, outer end 77 of first blade section 72 is farther from the cover 20 than inner end 76 of the first blade section 72. The second blade section 74 of the second blade means 70 is similarly pitched, with its leading edge 88 closer to the cover 20 than its respective trailing edge 89 and its outer end 87 farther from the cover 20 than its respective inner end 86.

For use, predetermined volumes of liquid and powdered food product are introduced into the container 12 to define an initial mixture volume which fills the chamber 26 of the container to an initial mixture line as illustrated by dashed line 90 in FIG. 2. The cover 20 is then secured upon the container 12 to seal the chamber 26 and the mixing device 10 is placed in a generally upright position as illustrated in FIG. 1. The cord 32 is connected to a suitable power supply and switch 34 is turned on to actuate the motor 30. The motor 30 rotates the shaft 40 and blade means 50 and 70 secured thereto, which mixes the powdered food product and liquid together. The motor 30 rotates the shaft 40 and blade means 50 and 70 in a rotational direction as shown generally by arrow 41 in FIG. 3. The pitch of the blade sections 52, 54, 72 and 74 and the generally circular cross-section of the container 12 combine to create a vortex in the liquid and powdered food product being mixed along the side wall 18 of the container 12.

The container 12 is preferably of a size to provide both a mixing (processing) container and serving vessel for an individual serving portion of processed powdered food product. Thus, when predetermined volumes of liquid and powdered food product are introduced into the container for mixing an individual serving portion of end product (to fill the container 12 to the level of line 90 of FIG. 2), the container 12 is sized so that the vortex created during mixing causes the liquid to engage the entire side wall 18 of the container 12. The general shape of the vortex created is indicated (in central vertical cross-section) by dashed line 91 in FIG. 2, which represents the surface of the liquid during mixing. No powdered food product is splashed onto the side wall 18 above the liquid in the container 12 during mixing—all of the powdered food product is entrained by the liquid during mixing and none is left on the walls of the container 12.

The vortex created by the rotation of the shaft 40 and blade means 50 and 70 induces air to be entrained in the liquid to provide an end product mixture of powdered food product and liquid having a "whipped" consistency. When the predetermined volumes of liquid and powdered food product are introduced into the container 12 to define the initial mixture volume as indicated by line 90 in FIG. 2, the air which is induced by the vortex to be entrained in the liquid creates an end product mixture of liquid, powdered food product and air having a volume greater than the initial mixture volume. The final volume of processed powdered food product (after mixing is completed) is thus greater than the initial mixture volume. The volume of the processed powdered food product in the container 12 after mixing is illustrated by dashed line 92 in FIG. 2.

As stated, the container 12 of the mixing device of the present invention is sized to provide both a mixing container and a serving vessel for an individual serving portion of processed powdered food product. The cover 20 is also made of such size so that a complete unit of cover 20 and container 12 (as shown in FIGS. 1 and 2) is relatively compact and easily transportable. For convenience, the container 12 and cover 20 may be provide with handles 94 and 96 respectively, as shown in FIG. 1.

One use for the mixing device 10 of the present invention is to prepare powdered high protein mixes used for weight control. In this instance, a predetermined amount of powdered high protein mix is introduced with approximately six ounces of liquid into the container 12. The cover 20 is secured thereon and the motor 30 is actuated to mix the powdered mix and liquid for approximately ten to fifteen seconds. The unique mixing properties achieved by the circular cross-section of the container 12 and the pitch of the blades attached to the shaft 40 create an end product volume of processed high protein drink of approximately ten ounces. The high protein mix is blended or whipped by the device of the present invention to the consistency of a milkshake-like drink. The mixing is quite thorough and quite consistant, unlike that achieved for high protein drinks when merely using a spoon or shaking or using some other type of beating, short of a full-sized blender.

With a mixing device 10 of the present invention so sized to mix one personal serving portion of powdered food product, the device 10 is small enough to be easily transportable in a purse or briefcase. Thus, a working person can introduce the powdered food product and liquid into the container 12 while at home in the morning, secure the cover 20 thereon, carry it to work (without fear of spillage) and store it until lunch time. At that time, the person can actuate the motor 30 to mix the powdered food product and liquid as described into a completely processed drink. The cover 20 can then be removed so that the processed drink can be consumed directly from the container 12. After a desired amount of processed drink has been consumed, the cover 20 can then be again secured to the container 12, sealing whatever is left of the drink in the container 12 for consumption at a later time. The mixing device 10 can later be retransported home (again with no fear of spillage) for cleaning and reuse the next day. Thus, there is no mess to deal with while at work or on the go. The transport, processing and consumption of the powdered food product are all taken care of quite neatly and efficiently by the mixing device 10 of the present invention.

Although the present invention has been described with reference to preferred embodiments, workers skilled in the art will recognize that changes may be made in form and detail without departing from the spirit and scope of the invention.

What is claimed:

1. A device for mixing powdered food product and liquid into a whipped consistency and serving, storing and transporting same, the device comprising:

an upright mixing, serving and storing container, the container having a circular bottom wall joined to a generally upright encompassing side wall which is circular in horizontal cross-section and the container having an open upper end portion and a vertical central axis;

a removable cover sealably mounted over the open upper end portion of the container to create a liquid-tight arrangement for mixing, storing and transporting powdered food and product and liquid therein;

motor means mounted with respect to the cover;

a rotatable shaft coupled to the motor means to be rotated thereby and extending sealably outwardly from the cover into the container along the axis of the container when the cover is secured thereon;

first blade means secured to the shaft adjacent a lower end thereof, the first blade means having a first blade section and a second blade section with the blade sections being positioned on opposite sides of the shaft, each blade section of the first blade means having an inner end adjacent to the shaft, an outer end, a leading edge with respect to the direction of shaft rotation and a trailing edge, with each blade section of the first blade means being pitched so that its the leading edge is closer to the cover than its respective trailing edge and its outer end is closer to said cover than its respective inner end; and second blade means secured to the shaft above and spaced from the first blade means, the second blade means having a first blade section and a second blade section with the blade sections of the second blade means extending outwardly from the opposite sides of the shaft generally centered on a line generally perpendicular to a line formed by the blade sections of the first blade means, each blade section of the second blade means having an inner end adjacent to the shaft, an outer end, a leading edge with respect to the direction of shaft rotation and a trailing edge, with each section of the second blade means being pitched so that its leading edge is closer to the cover than its respective trailing edge and its outer end is farther from the cover than its respective inner end so that when the motor means is actuated to rotate the rotatable shaft and the first and second blade means fixed thereto, the position and pitch of the blade sections and the circular cross-section of the container combine to create a vortex in the liquid and powdered food product being mixed which induces air to be entrained in the liquid to provide an end product mixture of powdered food product and liquid having a whipped consistency.

2. The invention of claim 1 wherein the open upper end portion of the container is a wide neck having screw threads formed on an outer surface thereof and the removable cover has a flange depending downwardly therefrom which has screw threads which fit the screw threads on the outer surface of the neck of the container.

3. The invention of claim 1 wherein when predetermined volumes of liquid and powdered food product are introduced into the container for mixing a personal serving volume of end product, and the vortex created causes the liquid to engage the entire side wall of the container.

4. The invention of claim 1 wherein when predetermined volumes of liquid and powdered food product are introduced into the container to define an initial mixture volume, the vortex created induces air to be entrained in the liquid to create an end product mixture of liquid, powdered food product and air having a volume greater than the initial mixture volume.

5. The invention of claim 1 wherein the container is sized to serve as both as a mixing container and a serving vessel for an individual serving portion of powdered food product.

6. The invention of claim 1 wherein the rotatable shaft is detachably coupled to the motor means.

7. The invention of claim 1, and further comprising, switch means for selectively actuating the motor means.

8. The invention of claim 9 wherein the switch means is mounted on the removable cover.

9. A device for use with a container having a circular horizontal cross section about a vertical axis and having an open upper end and used for mixing, storing, transporting and serving powdered food product and liquid in combination with such container, the device comprising:

a cover assembly having means to removably, sealably mount the cover assembly over the open end of a container with which the device is to be used to create a liquid-tight arrangement for mixing, storing and transporting powdered food product and liquid;

motor means mounted with respect to the cover assembly to be on the exterior of such container;

a rotatable shaft coupled to the motor means to be rotated thereby and extending sealably outwardly from the cover assembly to extend into such a container along a vertical axis of such container when the cover assembly is sealably mounted on such container;

first blade means secured to the shaft adjacent an end thereof remote from the cover assembly, the first blade means having a first blade section and a second blade section with the blade sections being positioned on opposite sides of the shaft, each blade section of the first blade means having an inner end adjacent the shaft, an outer end, a leading edge with respect to the direction of shaft rotation and a trailing edge, with each blade section of the first blade means being pitched so that the leading edge is closer to the cover assembly than its respective trailing edge and its outer end is closer to said cover assembly than its respective inner end; and second blade means secured to the shaft spaced from the first blade means in direction toward the cover assembly, the second blade means having a first blade section and a second blade section with the blade sections of the second blade means extending outwardly from opposite sides of the shaft generally centered on a line generally perpendicular to a line formed by the blade sections of the first blade means, each blade section of the second blade means having an inner end adjacent to the shaft, an outer end, a leading edge with respect to the direction of shaft rotation and a trailing edge, with each blade section of the second blade means being pitched so that its leading edge is closer to the cover assembly than its respective trailing edge and its outer end is farther from said cover assembly than its respective inner end so that when the motor means is actuated to rotate the rotatable shaft and the first and second blade means fixed thereto, the position and pitch of the blade sections and the circular cross-section of the container combine to create a vortex in the liquid and powdered food product being mixed which induces air to be entrained in the liquid to provide an end product mixture of powdered food product and liquid having a whipped consistency.

10. The invention of claim 9 wherein when predetermined volumes of liquid and powdered food product are introduced into the container to define an initial mixture volume, the vortex created induces air to be entrained in the liquid to create an end product mixture of liquid, powdered food product and air having a volume greater than the initial mixture volume.

11. The invention of claim 9 wherein the rotatable shaft is detachably coupled to the motor means.

* * * * *